United States Patent [19]
Day et al.

[11] Patent Number: 5,802,937
[45] Date of Patent: Sep. 8, 1998

[54] SMART TOOL HOLDER

[75] Inventors: Robert Dean Day; Larry R. Foreman; Douglas J. Hatch, all of Los Alamos, N. Mex.; Mark S. Meadows, Boston, Mass.

[73] Assignee: The Regents of The University of Calif., Oakland, Calif.

[21] Appl. No.: 507,628

[22] Filed: Jul. 26, 1995

[51] Int. Cl.⁶ ................................. B23B 1/00
[52] U.S. Cl. ................. 82/1.11; 82/134; 408/10
[58] Field of Search ............ 82/1.11, 133, 134; 408/10, 13

[56] References Cited

U.S. PATENT DOCUMENTS

| | | |
|---|---|---|
| 3,860,779 | 1/1975 | Marendaz . |
| 3,863,528 | 2/1975 | Wiesner ................................. 82/133 |
| 3,935,766 | 2/1976 | Masters ................................. 82/133 |
| 4,085,349 | 4/1978 | Farstad . |
| 4,353,018 | 10/1982 | Kohzai et al. ..................... 408/13 X |
| 4,400,118 | 8/1983 | Yamakage et al. ............... 408/13 X |
| 4,451,892 | 5/1984 | McMurty . |
| 4,513,646 | 4/1985 | McMurty . |
| 4,637,169 | 1/1987 | Sigg ................................. 408/10 X |
| 4,653,360 | 3/1987 | Compton . |
| 4,778,233 | 10/1988 | Christenson et al. . |
| 4,784,541 | 11/1988 | Umehara et al. ................. 408/10 X |
| 4,817,007 | 3/1989 | New . |
| 4,990,840 | 2/1991 | Migda . |
| 5,072,399 | 12/1991 | Laws et al. . |
| 5,193,314 | 3/1993 | Wormley et al. . |
| 5,312,329 | 5/1994 | Beaty et al. . |
| 5,347,895 | 9/1994 | Bellinghausen et al. ............. 82/134 X |

FOREIGN PATENT DOCUMENTS

| | | |
|---|---|---|
| 22569 | 1/1981 | European Pat. Off. . |
| 3238691 | 4/1984 | Germany . |
| 8364812 | 4/1983 | Japan . |
| 85231884 | 4/1987 | Japan . |
| 642838 | 1/1979 | U.S.S.R. . |
| 1183311 | 10/1985 | U.S.S.R. . |
| 1572789 | 6/1990 | U.S.S.R. . |
| 1317466 | 5/1973 | United Kingdom ............ 82/134 |

OTHER PUBLICATIONS

Day, Robert D. and Phillip E. Russell, "Ploughing on Gold Using a Scanning Tunneling Microscope," paper presented as ASPE 1993 Spring Topical Meeting, Apr. 13–15, 1993, Tucson, Arizona.

Day, Robert D., Phillip E. Russell and Alex Azarkhin, "Comparison of Measured and Predicted Plough Geometries and Forces for a Diamond Pyramidal Indentor Ploughing a Gold Surface," paper presented at 8th Annual ASPE Meeting, Nov. 7–12, 1993, Seattle, Washington.

IBM Journal of Research and Development, "Surface modification with the scanning tunneling microscope", vol. 30, No. 5, pp. 496–498, Sep. 1986.

Holm, Ragnar, Electric Contacts Theory and Application, "The relation between contact load and resistance, particulary at moderate and high load," pp. 40–48 and Contact resistance on freshly cleaned rods in air at very small contact loads, pp. 48–52, Springer–Verlag, 1967.

*Primary Examiner*—Daniel W. Howell
*Assistant Examiner*—Henry W.H. Tsai
*Attorney, Agent, or Firm*—Gemma Morrison Bennett

[57] ABSTRACT

There is provided an apparatus for machining surfaces to accuracies within the nanometer range by use of electrical current flow through the contact of the cutting tool with the workpiece as a feedback signal to control depth of cut.

4 Claims, 3 Drawing Sheets

SMART TOOL HOLDER

This invention was made with Government support under Contract No. W-7405-ENG-36 awarded by the U.S. Department of Energy. The Government has certain rights in the invention.

TECHNICAL FIELD

This invention relates to a method and apparatus for precision machining within very close tolerances.

BACKGROUND ART

Parts or objects which must be produced or finished within very close tolerances are presently produced by single point diamond machining, grinding, cutting or other machining processes. The accuracy of the cuts or machining made by the tool in all of these methods is dependent upon accurate positioning of the tool with respect to the workpiece.

Errors are introduced into diamond turning, grinding, lapping or other machining processes by machine compliance, thermal expansion or contraction, and wear of the cutting or grinding tool. Accurate real-time knowledge of the tool position with respect to the workpiece during the turning, grinding, machining or cutting process would be needed to adjust for these conditions.

Present machining equipment now uses various methods of detecting and controlling tool position with respect to the workpiece surface. These methods include: use of preprogrammed mathematical definitions of the workpiece surface which generate a series of position and velocity commands for the machine tool; use of feedback of the tool position obtained from a sensing device independent of the machine tool; and use of datum surfaces on part of the machine with the distance between the tool and the datum surface measured and compared to the distance between the tool and the workpiece which is sensed by having the workpiece and the tool connected in an electric circuit fed by a generator for producing saw-tooth signals. None of these methods can provide direct continuous, real-time monitoring of the position of the cutting tool with respect to the workpiece without use of separate senors or other indirect means of determining the position of the cutting tool. Direct, continuous, real-time monitoring of the position of the cutting tool with respect to the workpiece is necessary for micro-accuracy in grinding, cutting, turning or otherwise machining the surface of the workpiece.

There is a particular need for more accuracy for cutting or machining on the micro level when tolerances of a few nanometers are desired, as, for example, in applications such as fuel injectors, cylinder bores, cam shafts, ball bearings, optics, textured surfaces on specialized electronics parts, metal consumer goods and catalysts.

DISCLOSURE OF INVENTION

Therefore, it is an object of this invention to provide a precision machine tool holder with exceptionally fine control of the tool position with respect to the workpiece.

It is also an object of this invention to provide a precision machine tool holder with capacity for direct, continuous, real-time monitoring of the position of the cutting tool contemporaneous with the machining operation.

It is yet another object of this invention to provide a process for accurately cutting or machining surfaces within very close tolerances.

To achieve the foregoing and other objects the present invention provides a precision machine tool holder that controls the depth of cut by using direct contemporaneous feedback of the position of the cutting tool tip with respect to the workpiece surface, independent of the machine tool axes motions. While machining or cutting, the invention tool holder compensates for tool wear, thermal expansion and contraction, and machine compliance. This precision machine tool holder can be used to cut or machine surfaces within tolerances in the nanometer range.

Machining with the tool holder of this invention is accomplished by use of an apparatus having a cutting tool connected to a means for moving the cutting tool in precisely controlled increments (displacement producing means), with the displacement producing means connected to electrical output from a voltage comparator which compares a set point voltage with voltage from a current-to-voltage converter electrically connected to the cutting tool which makes electrical contact with a workpiece.

This invention provides a method in a machining operation for precision machining comprising:
  (a) contacting a workpiece with a cutting tool;
  (b) applying a bias voltage across the workpiece and the cutting tool so as to cause a flow of current between the workpiece and the cutting tool;
  (c) measuring the current flow between the workpiece and the cutting tool;
  (d) converting the flow of current from between the workpiece and the cutting tool into voltage;
  (e) with a voltage comparator comparing the voltage with a set voltage;
  (f) adjusting the depth of the cutting tool in the workpiece by use of a displacement producing means responding to signals from the voltage comparator; and
  (g) thereby producing an amount of current flow between the cutting tool and the workpiece sufficient to cause the voltage being compared with the set voltage to equal the set voltage.

BEST MODES FOR CARRYING OUT THE INVENTION

Figure 1:
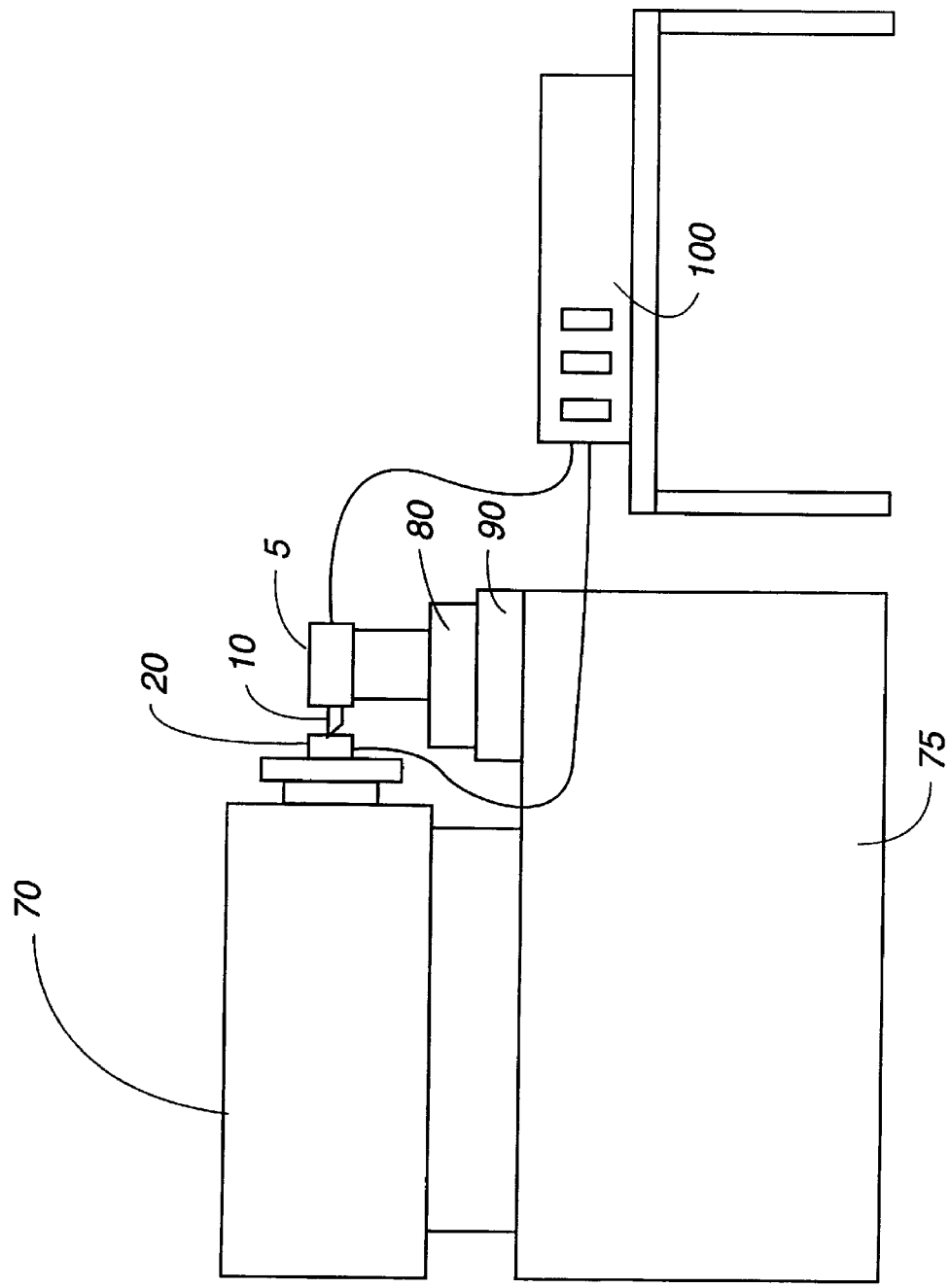
FIG. 1 shows an example of how the smart tool holder may be set up.

We have discovered a novel apparatus that will enable precision machining or cutting of surfaces to levels of accuracy within 5 nanometers. The invention apparatus uses a "smart tool holder" which can allow for a real-time knowledge of where a cutting tool is with respect to a workpiece within the range of several nanometers to several microns while the cutting or machining process is going on.

The invention uses a measurement of electrical current flow at a specified voltage between the cutting tool and the workpiece as a feedback signal which can be compared with a set point current to control depth of cuts being made during precision machining or cutting. Thus the depth of the cutting tool can be set directly while the tool is cutting. This allows the finish of surfaces to be controlled to the level of a few nanometers even as the cutting tool wears.

A known bias voltage is applied across the cutting tool and workpiece. The amount of current flow between the cutting tool and workpiece is a function of the amount of bias voltage and the depth of cut. Therefore, if the bias voltage is fixed, the amount of current flow then becomes a function of the depth of cut. So as the depth of cut increases, the current flow also increases.

Current-to-voltage conversion circuitry measures the current flow between the cutting tool and workpiece and converts it to a representative voltage for the desired depth of cut. The representative voltage is transmitted to a comparator which compares the representative voltage across the cutting tool and workpiece contact with that of the set point voltage. The comparator then outputs a signal to a displacement producing means so as to move the cutting tool into or out of the workpiece surface as necessary to achieve the desired depth of cut which is determined by the set point voltage.

When it is desired to have the cutting tool making cuts of uniform depth in the surface of the workpiece, then the current flow at a constant bias voltage is set at a constant level. With the current flow at a constant bias voltage maintained at a constant level, the displacement producing means will keep moving the cutting tool tip in whatever direction and to whatever extent necessary to make the cuts of uniform depth into the surface of the workpiece.

Electrical contact with the cutting tool is by means of clamping the tool in a conductive holder that is attached to a power supply. In a turning operation, sliprings, brushes, or comparable devices can be used to complete the electrical circuit to the workpiece. If the workpiece can be connected to a ground through the machine tool, the chuck used to hold the workpiece can complete the electrical connection to the workpiece.

The cutting tool can be made of any material hard enough to plastically deform the surface of the workpiece. The cutting tool is generally made of a electrically conductive or semiconductive material such as tool steel, tungsten carbide, silicon carbide, diamond, cubic boron nitride or other materials known in the art. Some of the cutting tool materials can be doped to enhance conductivity. Presently preferred, when machining workpieces of steel, are cutting tools made of doped diamond. The cutting tool is attached to the displacement producing means by a clamp.

Any of various displacement producing means known in the art can be used to move the cutting tool on the axis along which the cutting tool is fed into the workpiece. These include, but are not limited to, motor and slide assemblies, voice coil and slide assemblies, and piezoelectric crystals. In the present invention, piezoelectric devices in scanning tunneling microscopes have been used advantageously as a displacement producing means to control the movement of the cutting tool.

The feedback from the cutting tool/workpiece contact also compensates for wear of the cutting tool, since a worn off, shorter tool will conduct less current, if being held at a constant position. This causes changes in the current flow which adjusts the position of the cutting tool. The smart tool holder will adjust the position of the tool and, in this case, will move the tool toward the workpiece to compensate for shortness of the tool caused by tool wear.

The operation of the smart tool holder is governed by the equation:

$$I = f(d, V) \quad (1)$$

Where
 I=electrical current
 f=function
 d=depth of cut
 V=voltage

The function f will vary according to whether the tool/workpiece contact is a conductor/conductor, semiconductor/conductor, conductor/semiconductor, or semiconductor/semiconductor contact.

From this equation it can be seen that with a constant voltage and a constant current, the depth of cut will remain constant even with moderate tool wear. Since current flow is a function of the depth of cut and of the voltage being applied, if the current flow and voltage are held constant, then the depth of cut can be held constant.

Consistent with this equation, if it is desired to reduce the depth of cut by backing the cutting tool out away from the surface being machined, this is accomplished by either increasing the bias voltage or by decreasing the set point current. Conversely, if it is desired to increase the depth of cut by moving the cutting tool further into the surface being machined, this is accomplished by either decreasing the bias voltage or by increasing the set point current.

The smart tool holder can be set up for precision machining on a lathe 75 as shown in FIG. 1. With reference to FIG. 1, the smart tool holder 5 can be mounted in a position perpendicular to the surface of the workpiece 20 which is mounted on a means for rotating the workpiece such as a spindle 70. Alternatively, the smart tool holder 5 can be mounted in positions at any angle and can be mounted on a means for rotating or moving the smart tool holder along any of six axes. The workpiece 20 can be moveable or stationary when the smart tool holder 5 is movably mounted. The workpiece 20 can be mounted so as to be moveable along any of six axes by use of slides 80, 90, or other means known in the art. The controls 100 for the smart tool holder 5 are shown in the figure.

Figure 2:
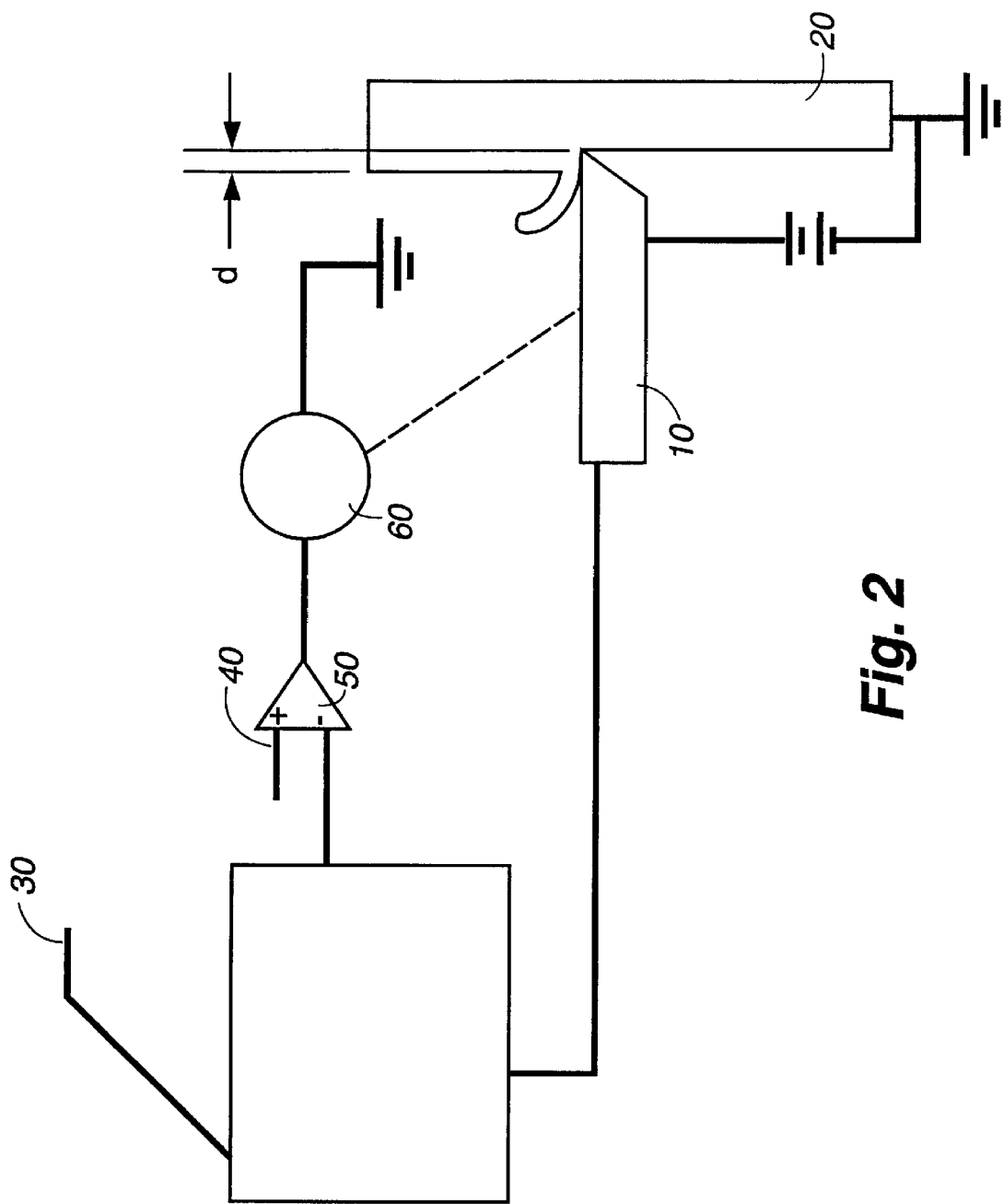
FIG. 2 shows a schematic electrical circuit diagram of the smart tool holder set-up.

FIG. 2 is an electrical schematic showing the feedback for control of the invention during a machining or cutting process. With reference to FIG. 2, a bias voltage is applied across the contact of the cutting tool 10 with the surface of the workpiece 20. Current from the cutting tool 10 flows to a means for converting the current to voltage (current-to-voltage converter 30). Voltage from the current-to-voltage converter 30 is compared with reference voltage from a current set point 4 in a voltage comparator 50. Signals from the voltage comparator 50 are transmitted to a means 60 for moving the cutting tool 10 into or out of the surface of the workpiece 20, thereby adjusting the depth of the cut. The means 60 for moving the cutting tool 10 can be a piezoelectric crystal, a motor and slide assembly, a voice coil and slide assembly, or other moving mechanism with sufficient stiffness and resolution.

The "smart tool holder" of this invention provides exceptionally fine control of the tool position with respect to the workpiece, at least an order of magnitude beyond that which can possibly be provided by a human operator and beyond that provided by the machining tool itself or that obtainable with computer numerical controls of the machine tool. The smart tool holder provides control that reacts and moves the tool on the scale of nanometric dimensions.

The smart tool holder of this invention has a capacity for direct continuous, real-time monitoring of the position of the machine tool with respect to the workpiece contemporaneous with the machining operation. In the process of this invention, the smart tool holder can be used for accurately cutting or machining surfaces within very close tolerances.

The smart tool holder can be used to alter chip flow during a machining operation simply by adjusting the polarity of the bias voltage.

The smart tool holder of this invention can be used to make textured surfaces with texturing on the microscopic scale, as would be desired for applications such as specialized electronics, metal consumer goods, or for any machining application where precision is desired.

The same amount of precision can be obtained using less stringent machine stiffness and thermal stability requirements by use of the invention smart tool holder. The smart tool holder can greatly increase the precision achievable on a standard lathe and make significant improvements in the precision achievable on precision or ultraprecision lathes.

Conventional finish cuts in machining processes can be followed by use of the invention method to achieve the desired part tolerances at extremely small scales (e.g., on the nanometer levels).

Use of the smart tool holder will allow precision cutting to continue even while the tool is wearing. The novel feedback system of this invention allows for automatic compensation for tool wear on a continuous basis during the precision machining process. The diagnostics (monitoring of current and voltage changes) inherent in the smart tool holder can allow continuous real-time monitoring of the condition of the tool.

EXAMPLE I

To demonstrate the operability of the invention, a series of finely spaced grooves were made in a hardened steel surface. A Nanoscope II microscope with a stand alone scanning tunneling microscope head which had a conductive diamond three-sided pyramid shaped tip with a radius of about 100 nanometers was used. The microscope head was mounted to the tool post of a Moore M18 AG diamond turning lathe.

A workpiece made of 400 series stainless steel which had been hardened to over 60 Rc was mounted to the lathe spindle. The workpiece was 1.5" long by 0.375" wide by 0.004" thick with a surface which was finely ground to 5 nanometer root mean square surface finish. The lathe spindle was locked into position so that the workpiece could not turn.

A bias voltage of 1 to 2 volts was applied across the tool and the workpiece. The current was set at 1 nA, which was the equivalent of a resistance of 1–2 GΩ. The z axis on the lathe was enabled so that the tool was moved by the lathe toward the surface of the workpiece.

From measurements in previous runs, it was possible to choose a set point at which the tool tip would be "just touching" the surface of the workpiece. "Just touching" meant that about 1 µN of force was being induced by the diamond on the steel. That was not enough force to plastically deform the surface. When the current reached the set point value of 1 nA, the z axis motion on the lathe was stopped.

To produce the grooves, the bias voltage was then adjusted to the range of 1 mV to 100 mV (the actual amount depended upon the depth of groove desired). The bias voltage was typically about 5 mV, which corresponded to a depth of about 200 nanometers. The effect of thusly adjusting the voltage was to reduce the set point resistance (defined as the voltage/current) to 5 megaohms. In order for the 1 nA of current to flow, the control system plunged the diamond tool into the surface along the z axis to a depth of 200 nanometers until the contact area was great enough for 1 nA of current to flow. At this point the x axis of the lathe was activated; the activated x axis moved the tool down the length of the workpiece at a speed of 100 mm/minute. In this example, the displacement means was the piezoelectric crystal in the scanning tunneling microscope head. This process was repeated many times with a small displacement along the y axis to create the chosen number of grooves in the surface of the workpiece. Movement along the y axis (groove spacing) and along the z axis (tool depth in surface of workpiece) were provided by operation of the piezoelectric crystal in the scanning tunneling microscope head.

The resulting 30 grooves per surface of the workpiece were 200 nanometers in depth and 1 inch in length and were spaced at intervals of 3 micrometers.

Figure 3:
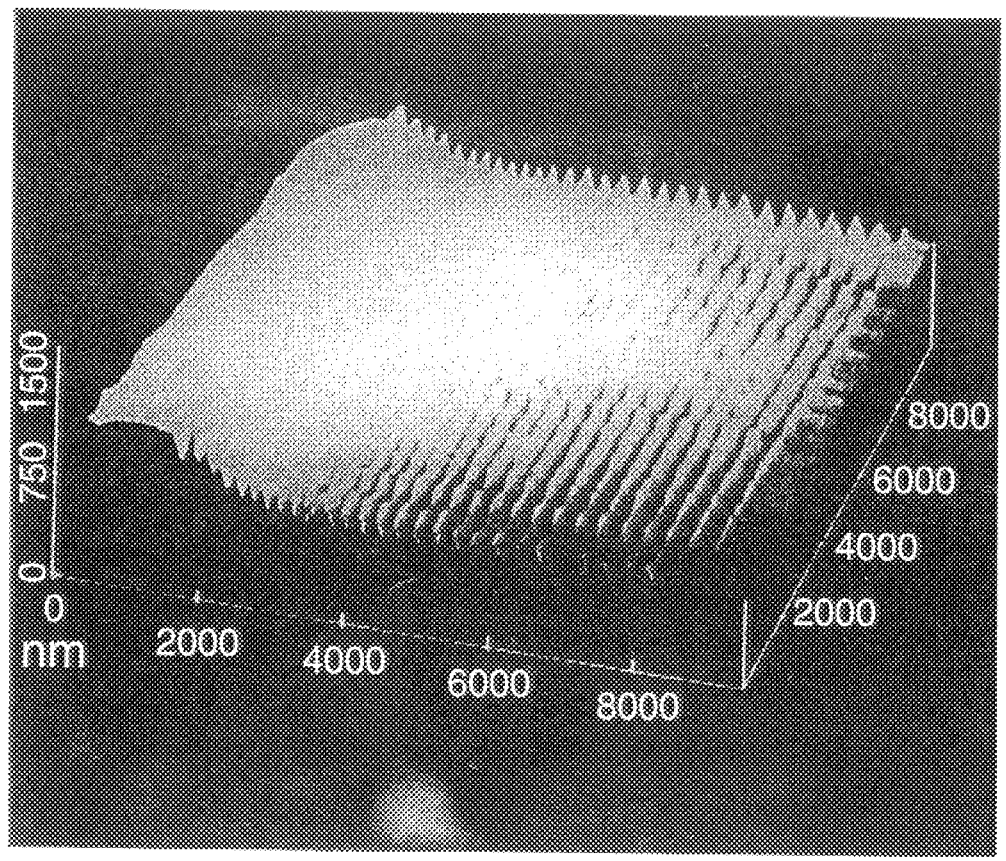
FIG. 3 shows an example surface that has been grooved by the invention apparatus.

FIG. 3 shows grooves which have been machined in a steel surface using the invention smart tool holder. The grooves are at a mean spacing of 2.8 microns, with depths that range from 126 to 226 nanometers. The variations in depth of the grooves are believed to have been caused by variations in the thickness of the steel workpiece which allowed deflection of the workpiece during the machining. Generally, the variations in depths of grooves occurred on portions of the workpiece which were thinnest.

INDUSTRIAL APPLICABILITY

The smart tool holder can be used for any application which requires high degrees of accuracy in precision machining the surface of any part which is conductive to electrical currents. The invention can be used to produce components whose surfaces require dimensional control in the nanometer to micrometer range.

This technology can be used to produce ultra precise engineered surfaces with multifarious applications which can include, optics, catalysts, textured surfaces for high speed electronics components, fuel injectors, cylinder bores, cam shafts, ball bearings, metal consumer goods, and any application which requires high precision machining.

The smart tool holders of this invention can be used as add-ons to computer numerically controlled machine tools to greatly enhance their utility.

The smart tool holders of this invention can also be used to increase the precision of manual machine tools because of the advantages of directly sensing the depth of cuts.

That which is claimed is:

1. A method for precision machining comprising:
   (a) contacting a workpiece with a cutting tool;
   (b) applying a bias voltage across said workpiece and said cutting tool so as to cause a flow of current between said workpiece and said cutting tool;
   (c) measuring the current flow between said workpiece and said cutting tool;
   (d) converting said flow of current from between said workpiece and said cutting tool into voltage;
   (e) with a voltage comparator comparing said voltage with a set voltage;
   (f) simultaneously measuring the position of the cutting tool during cutting and adjusting the depth of said cutting tool in said workpiece by use of a displacement producing means responding to signals from said voltage comparator; and
   (g) thereby producing an amount of current flow between said cutting tool and said workpiece sufficient to cause said voltage being compared with said set voltage to equal said set voltage.

2. A process for precision machining comprising contacting a workpiece with a cutting tool, determining the position of said cutting tool by measuring current flow from said cutting tool across a conductive workpiece, transmitting an electrical signal to a reference means of comparing said current with a selected current set point, transmitting an electrical signal from said reference means to a displacement producing means, concurrently with determination of the position of said cutting tool displacing said cutting tool by said displacement producing means the distance necessary to cause said current flow from said cutting tool across said conductive workpiece to equal said set point current, thereby controlling the depth of said cutting tool in the surface of said workpiece.

3. A process as recited in claim 2 wherein said displacement producing means comprises a piezoelectric crystal.

4. A process as recited in claim 2 wherein said process thereby further controls lateral movement of said cutting tool.

\* \* \* \* \*